(No Model.)
G. W. FULMER.
CAR AXLE JOURNAL BEARING.
No. 342,436. Patented May 25, 1886.
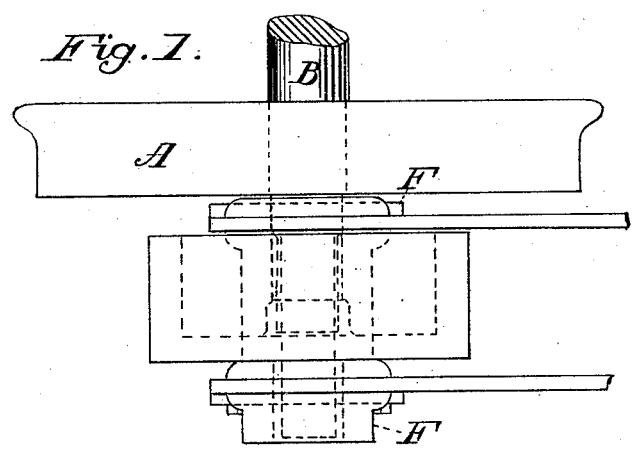
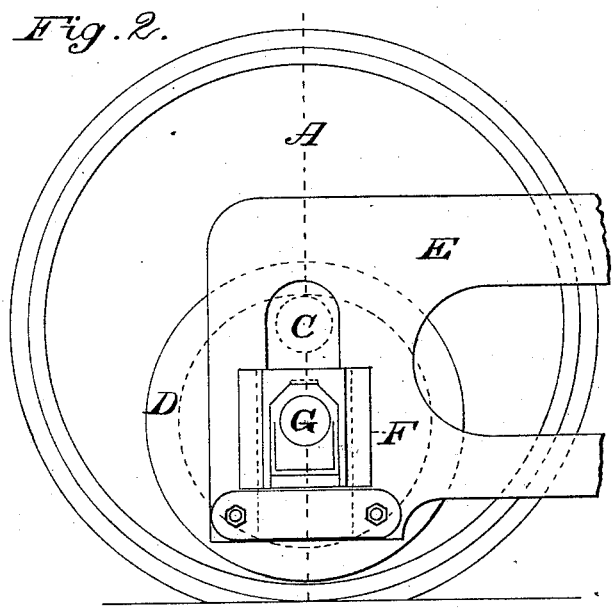
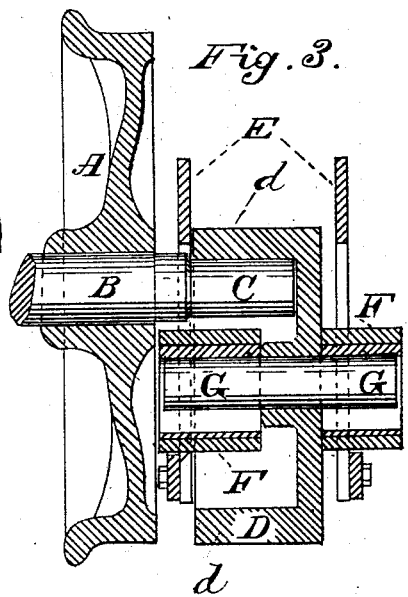
WITNESSES:
John J. King
Charles A. Burgeson
George W. Fulmer
INVENTOR
By R. S. & A. P. Lacey
ATTORNEYS

UNITED STATES PATENT OFFICE.

GEORGE WASHINGTON FULMER, OF WATER VALLEY, MISSISSIPPI.

CAR-AXLE JOURNAL-BEARING.

SPECIFICATION forming part of Letters Patent No. 342,436, dated May 25, 1886.

Application filed July 19, 1884. Serial No. 138,215. (No model.)

*To all whom it may concern:*

Be it known that I, GEORGE WASHINGTON FULMER, a citizen of the United States, residing at Water Valley, in the county of Yalobusha and State of Mississippi, have invented certain new and useful Improvements in Car-Axle Journal-Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in outside journal-bearings of car-axles in which an annular wheel is introduced between the journal and point of suspension; and the objects of my invention are, first, to produce a rolling contact on the journal, instead of abrasion; secondly, to reduce the speed and friction of the journal or journals of the annular wheel, which journal or journals have abrasion; thirdly, a saving of oil in lubricating the journal or journals of the annular wheel; fourthly, to reduce the force now necessary to move the car; fifthly, to prevent the liability of hot journals to a very great extent. I attain these objects by the mechanism illustrated in the accompanying drawings, in which—

Figure 1 is a plan; Fig. 2, an elevation with the cellar of the oil-box removed. Fig. 3 is a vertical section of the whole through the center of the journals.

Similar letters of reference refer to similar parts throughout the several views.

A wheel, A, has an axle, B, and journal C. On this journal I place the flange *d* of a wheel, D, which has a shaft-journal, G, upon which rest the oil boxes and brasses F. These boxes will be secured by arch bars or frames E, or in pedestals, as may best suit the truck or car to be supplied. The wheel A, turning upon the track, turns the journal C, which is fast in the wheel A. This journal C turns the annular wheel D, but at a reduced speed. The wheel A being, say, thirty-three inches in diameter, and the journal C three and one-half inches in diameter, and the annular wheel fifteen inches inside diameter, the movements would be about six hundred and eleven revolutions for wheel A per mile, while annular wheel would only make about one hundred and twenty-four revolutions per mile, and thus by the reduction gaining a large percentage over the force generally required to move a car or truck. By my construction it will be noticed that the shaft-journal G has a much slower movement than the flanged wheel D, owing to the latter being loosely mounted thereon. Consequently the friction is diminished and the abrasion reduced to a minimum.

In practice, in case of breakage or wear the shaft-journal or flanged wheel may be replaced independent of each other and at a small cost.

I am aware that prior to my invention antifriction wheels and rollers have been used in connection with car-wheel journals.

I am also aware that the body of the car has been provided with a flanged wheel, which is hung on the journal of the track-wheel. I therefore do not claim such as a combination, broadly; but What I do claim as my invention, and desire to secure by Letters Patent, is—

The combination of the truck-wheel having an extended journal, the truck-frame provided with boxes arranged at a distance apart, a shaft journaled in said boxes, and a flanged wheel loosely mounted on the shaft between the boxes, and having its flange resting on the extended journal of the truck-wheel, substantially as shown, and for the purposes specified.

In testimony whereof I affix my signature in presence of two witnesses.

GEORGE WASHINGTON FULMER.

Witnesses:
J. Q. MORRISON,
W. S. CHAPMAN.